US011656422B2

(12) United States Patent
Pilon

(10) Patent No.: US 11,656,422 B2
(45) Date of Patent: May 23, 2023

(54) MODULAR FIBRE OPTIC CASSETTE, SYSTEM AND METHOD

(71) Applicant: BELDEN CANADA ULC, Saint-Laurent (CA)

(72) Inventor: Vincent Pilon, Lachine (CA)

(*) Notice: Subject to any disclaimer, the term of this patent is extended or adjusted under 35 U.S.C. 154(b) by 0 days.

(21) Appl. No.: 17/929,566

(22) Filed: Sep. 2, 2022

(65) Prior Publication Data

US 2022/0413245 A1 Dec. 29, 2022

Related U.S. Application Data

(63) Continuation of application No. 17/010,113, filed on Sep. 2, 2020, now Pat. No. 11,435,542, which is a continuation of application No. 16/143,831, filed on Sep. 27, 2018, now Pat. No. 10,795,107.

(60) Provisional application No. 62/567,339, filed on Oct. 3, 2017.

(51) Int. Cl.
G02B 6/44 (2006.01)
G02B 6/46 (2006.01)

(52) U.S. Cl.
CPC ............. G02B 6/4455 (2013.01); G02B 6/46 (2013.01)

(58) Field of Classification Search
None
See application file for complete search history.

(56) References Cited

U.S. PATENT DOCUMENTS

| 3,913,866 | A | 10/1975 | Hankins et al. |
|---|---|---|---|
| 4,792,203 | A | 12/1988 | Nelson et al. |
| 7,331,722 | B2 | 2/2008 | Tan |
| 7,509,015 | B2 | 5/2009 | Murano |
| 9,008,485 | B2 | 4/2015 | Ramirez et al. |
| 9,075,216 | B2 | 7/2015 | Cote et al. |
| 9,690,064 | B2 * | 6/2017 | Sauter .................. G02B 6/4452 |
| 10,215,944 | B2 | 2/2019 | Sedor et al. |
| 10,281,672 | B1 | 5/2019 | Mullsteff |
| 10,359,595 | B2 | 7/2019 | Aramayo et al. |
| 10,514,518 | B1 | 12/2019 | Livingston et al. |
| 10,598,884 | B2 | 3/2020 | Fontaine et al. |
| 10,656,359 | B2 | 5/2020 | Fontaine et al. |
| 10,768,387 | B2 | 9/2020 | Pilon et al. |
| 10,795,107 | B2 | 10/2020 | Pilon |
| 11,187,864 | B2 | 11/2021 | Crawford et al. |
| 2002/0131730 | A1 | 9/2002 | Keeble et al. |
| 2007/0131628 | A1 | 6/2007 | Mimlitch |
| 2009/0290842 | A1 | 11/2009 | Bran De Leon et al. |
| 2016/0033732 | A1 | 2/2016 | Giraud et al. |

(Continued)

Primary Examiner — Rhonda S Peace
(74) Attorney, Agent, or Firm — Lavery, de Billy, LLP; Hugh Mansfield

(57) ABSTRACT

A method for organising a tray comprising a front edge in a fiber optic interconnect system is disclosed. The method comprises defining a standard width unit wherein a width of the front edge is substantially evenly divisible by the standard width unit, selecting a plurality of cassettes for installation on the tray from a set of cassettes having a plurality of different cassette widths as measured between outer side edges thereof, wherein each of the different cassette widths is evenly divisible by the standard width unit, and releasably securing said selected cassettes along the front edge of the tray, wherein when arranged on the tray an outer side edge of each of said selected cassettes is directly adjacent an outer side edge of at least one other selected cassette.

65 Claims, 13 Drawing Sheets

(56) References Cited

U.S. PATENT DOCUMENTS

| | | |
|---|---|---|
| 2016/0062050 A1 | 3/2016 | Giraud et al. |
| 2016/0062055 A1* | 3/2016 | Giraud ................. G02B 6/4453 385/56 |
| 2016/0062068 A1 | 3/2016 | Giraud et al. |
| 2019/0004268 A1 | 1/2019 | Vogel |
| 2019/0101717 A1 | 4/2019 | Pilon |
| 2019/0107682 A1 | 4/2019 | Aramayo et al. |
| 2019/0162924 A1 | 5/2019 | Fontaine et al. |
| 2019/0187394 A1 | 6/2019 | Fontaine et al. |
| 2020/0131730 A1 | 4/2020 | Spiro |

\* cited by examiner

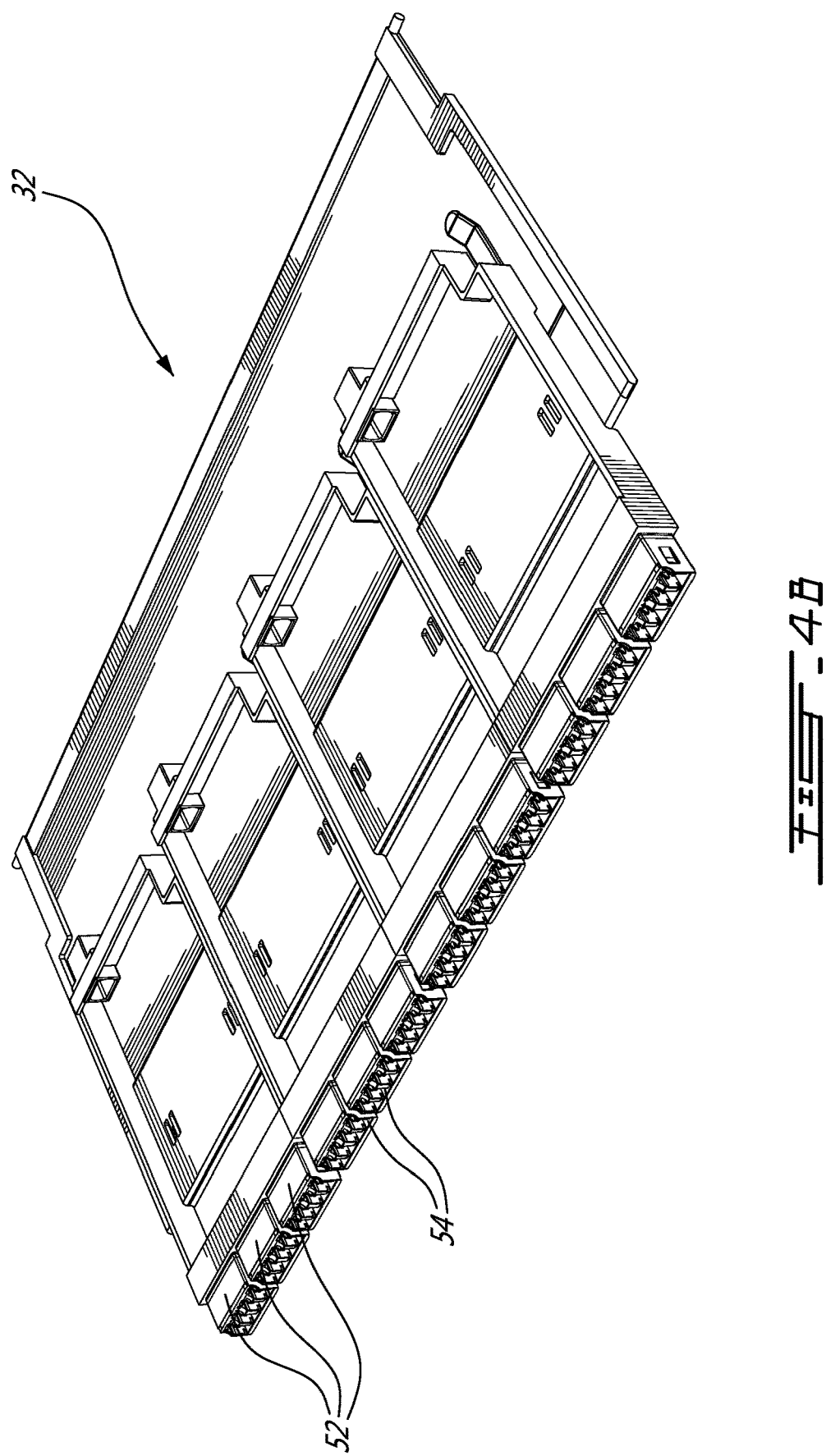

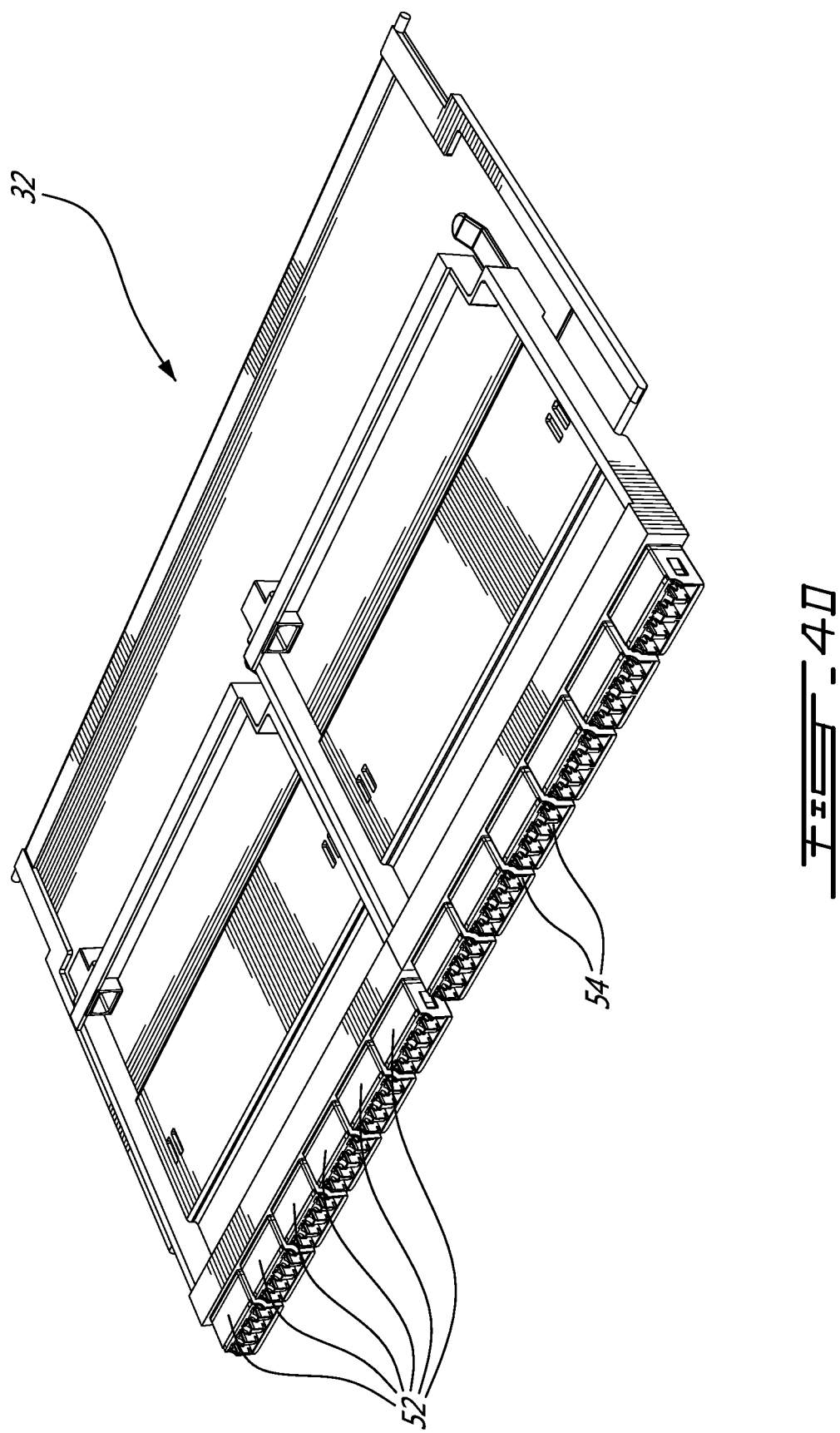

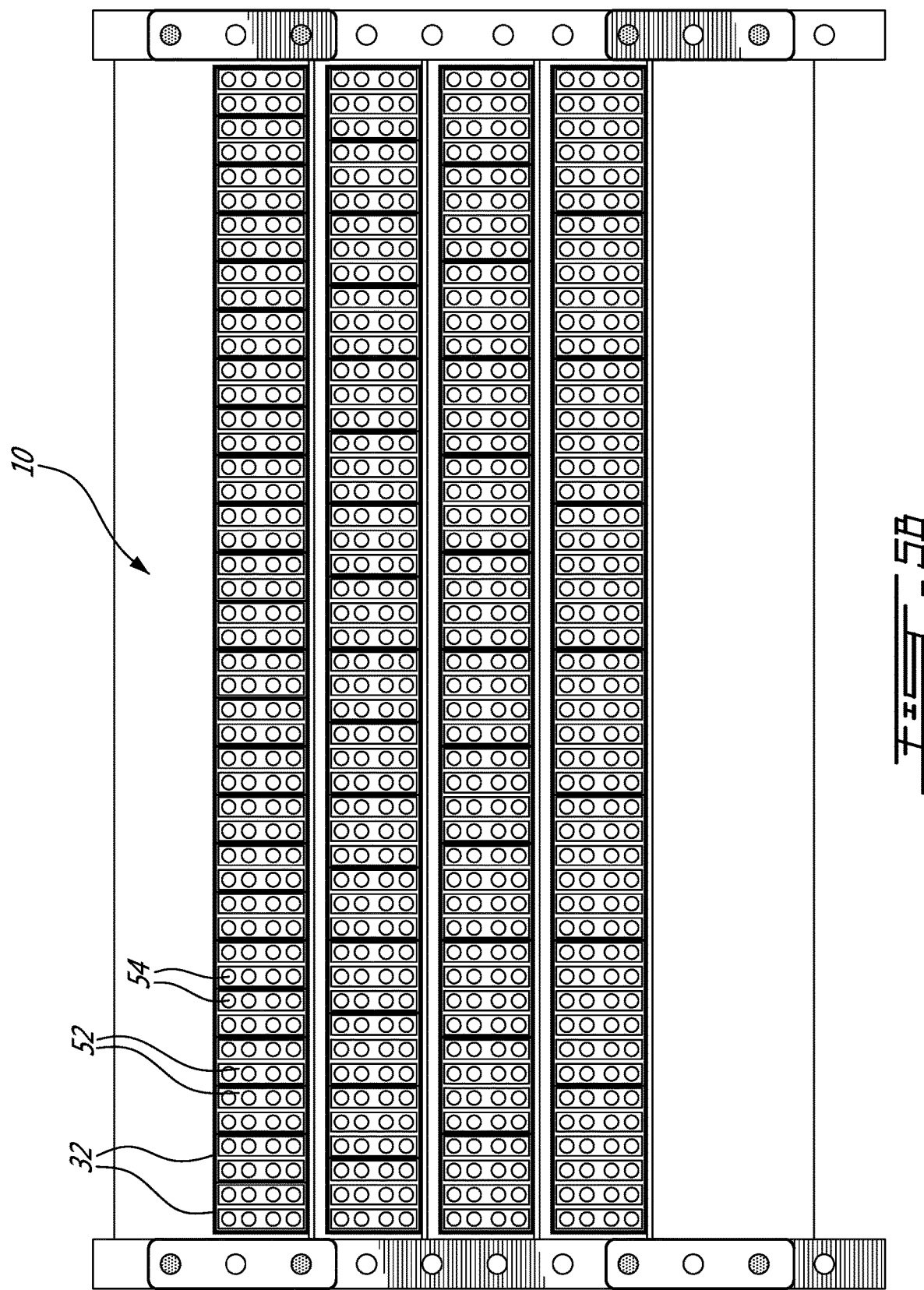

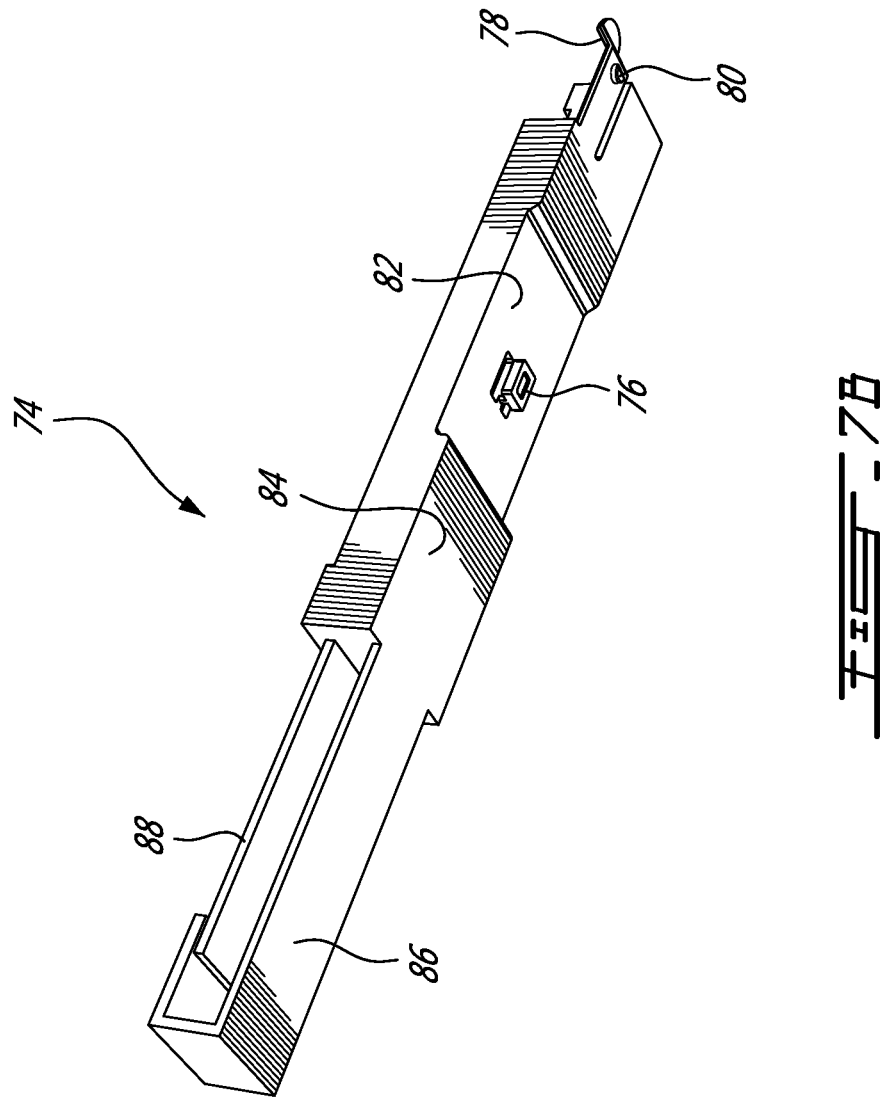

MODULAR FIBRE OPTIC CASSETTE, SYSTEM AND METHOD

CROSS REFERENCE TO RELATED APPLICATIONS

This application is a continuation application of U.S. patent application Ser. No. 17/010,113 filed on Sep. 2, 2020 which is in turn a continuation application of U.S. patent application Ser. No. 16/143,831 filed on Sep. 27, 2018, now U.S. Pat. No. 10,795,107 which in turn claims priority under 35 USC § 119(e) of U.S. provisional application Ser. No. 62/567,339 filed on Oct. 3, 2017. All the above documents are incorporated herein in their entirety by reference.

FIELD OF THE INVENTION

The present invention relates to a modular fiber optic cassette, system and method. In particular, the present invention relates to a fiber optic cassette comprising a width of one or more standard width units and such that fiber optic cassettes of different widths can be arranged on the same tray while optimizing the use of tray space.

BACKGROUND OF THE INVENTION

The prior art discloses fiber optic cassettes or splice boxes for use in terminating fiber optic trunk cables and splitting them out to patch cables which are removeably arranged on tray systems within a rack mounted case. One drawback of these cassettes and tray systems is that they are typically preconfigured to terminate fiber optic cables comprising a single predetermined number of optic fibers. Another drawback is that cassettes which are used to terminate fiber optic cables comprising different numbers of optic fibers are generally incompatible with one another and additionally require trays with different spacing, securing mechanisms and the like.

SUMMARY OF THE INVENTION

In order to address the above and other drawbacks there is provided a method for organising a tray comprising a front edge in a fiber optic interconnect system. The method comprises defining a standard width unit wherein a width of the front edge is substantially evenly divisible by the standard width unit, selecting a plurality of cassettes for installation on the tray from a set of cassettes having a plurality of different widths, wherein each of the different widths is evenly divisible by the standard width unit, and releasably securing the selected cassettes along the front edge of the tray. When arranged on the tray each of said selected cassettes is directly adjacent at least one other selected cassette.

BRIEF DESCRIPTION OF THE DRAWINGS

FIGS. 4A through 4D provide raised right front perspective views of a tray populated with respectively six (6), four (4), three (3) and two (2) cassettes of different widths;

FIGS. 5A, 5B and 5C provide front plan views of a modular fiber optic cassette and system mounted in a rack respectively in accordance with first, second and third alternative embodiments of the present invention;

FIGS. 7A and 7B provide respectively a raised right front perspective view of a tray comprising a plurality modular fiber optic cassettes and a pair of cable management brackets and lowered right front perspective view of a cable management bracket in accordance with a second alternative illustrative embodiment of the present invention.

DETAILED DESCRIPTION OF THE ILLUSTRATIVE EMBODIMENTS

Figure 1:
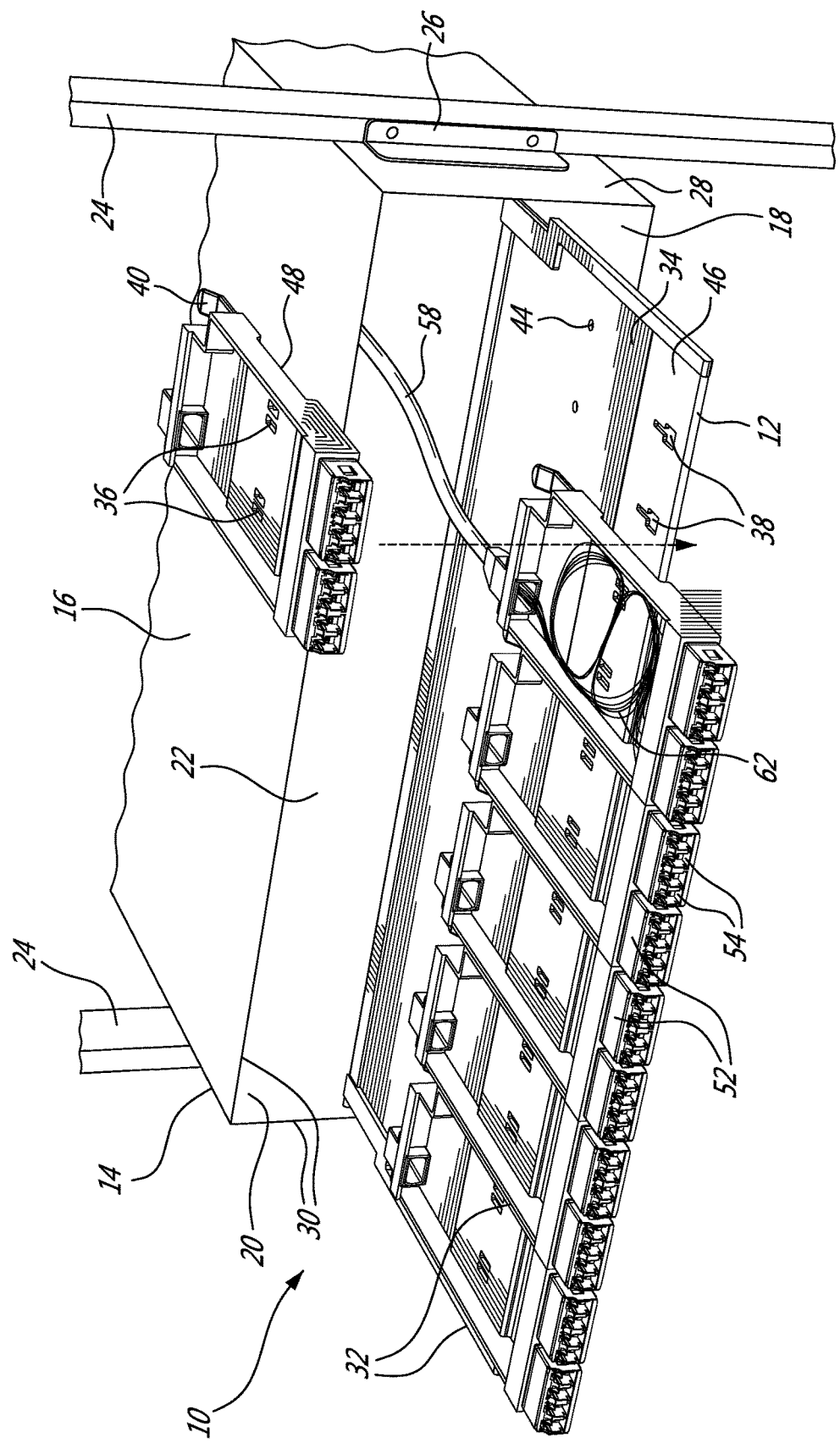
FIG. 1 provides a right front perspective view of a modular fiber optic cassette and system mounted in a rack and in accordance with an illustrative embodiment of the present invention.

Referring now to FIG. 1, a modular cassette system, generally referred to using the reference numeral 10, will now be described. The modular cassette comprises a slideable tray 12 illustratively mounted within a case 14. The case 14 comprises a top wall 16, a bottom wall 18 and a pair of opposed side walls 20 defining a tray receiving space 22 therebetween. The case 14 is illustratively mounted to the rails 24 of a rack via a pair of mounting brackets 26 wherein one of the brackets 26 is attached to an outer surface 28 of a respective one of the sidewalls 20. The front edges 30 of the walls 16, 18, 20 define an opening via which the tray receiving space 22 can be accessed. In a particular illustrated embodiment the system 10 is shown for mounting in a 19" rack, however in a particular embodiment the system 10, with suitable modifications, may be mounted equally in a cross connect system, fiber bay or wall mount or the like.

Figure 2:
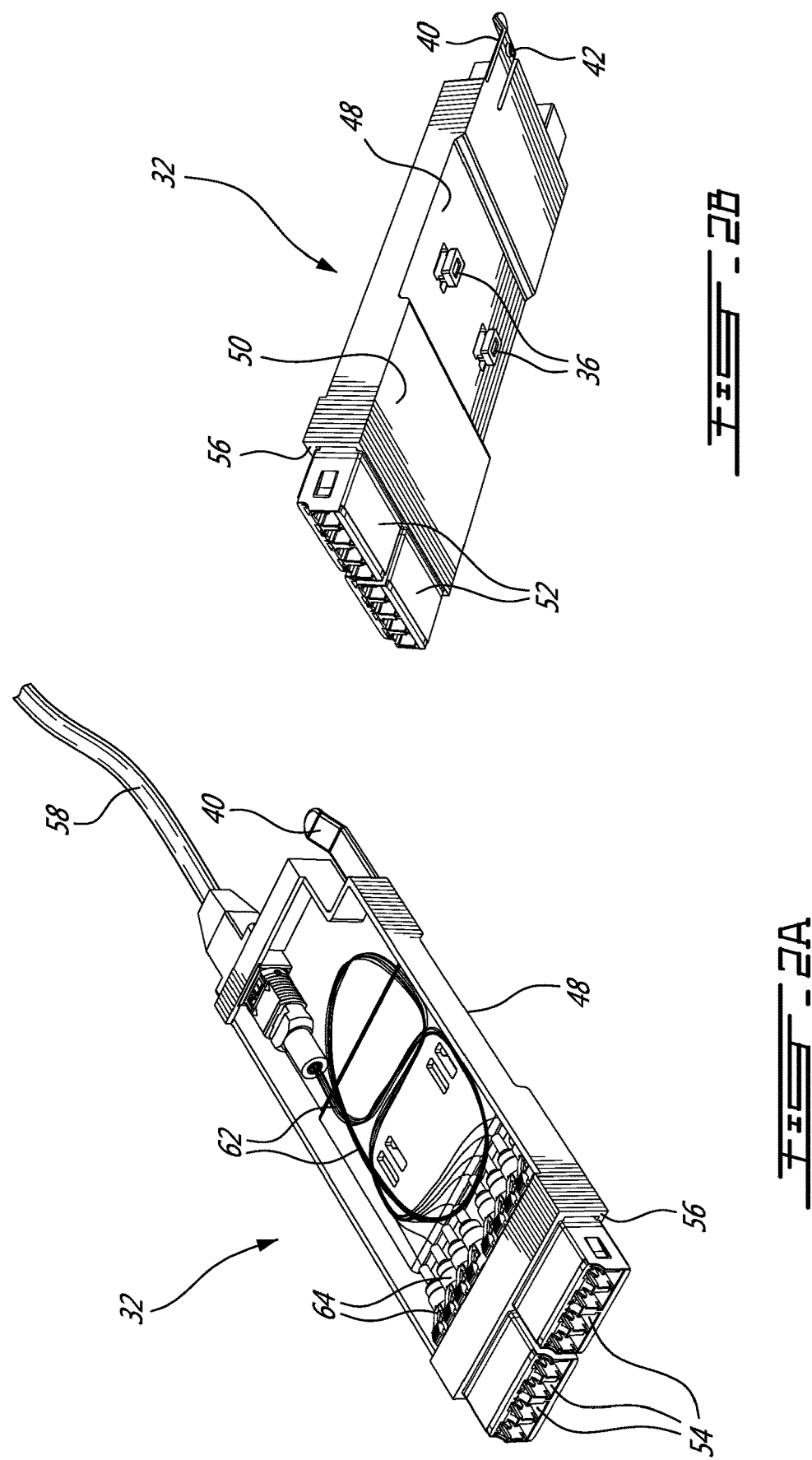
FIGS. 2A and 2B provide respectively a raised right front perspective view and a lowered right front perspective view of a modular fiber optic cassette in accordance with an illustrative embodiment of the present invention.
Figure 3:
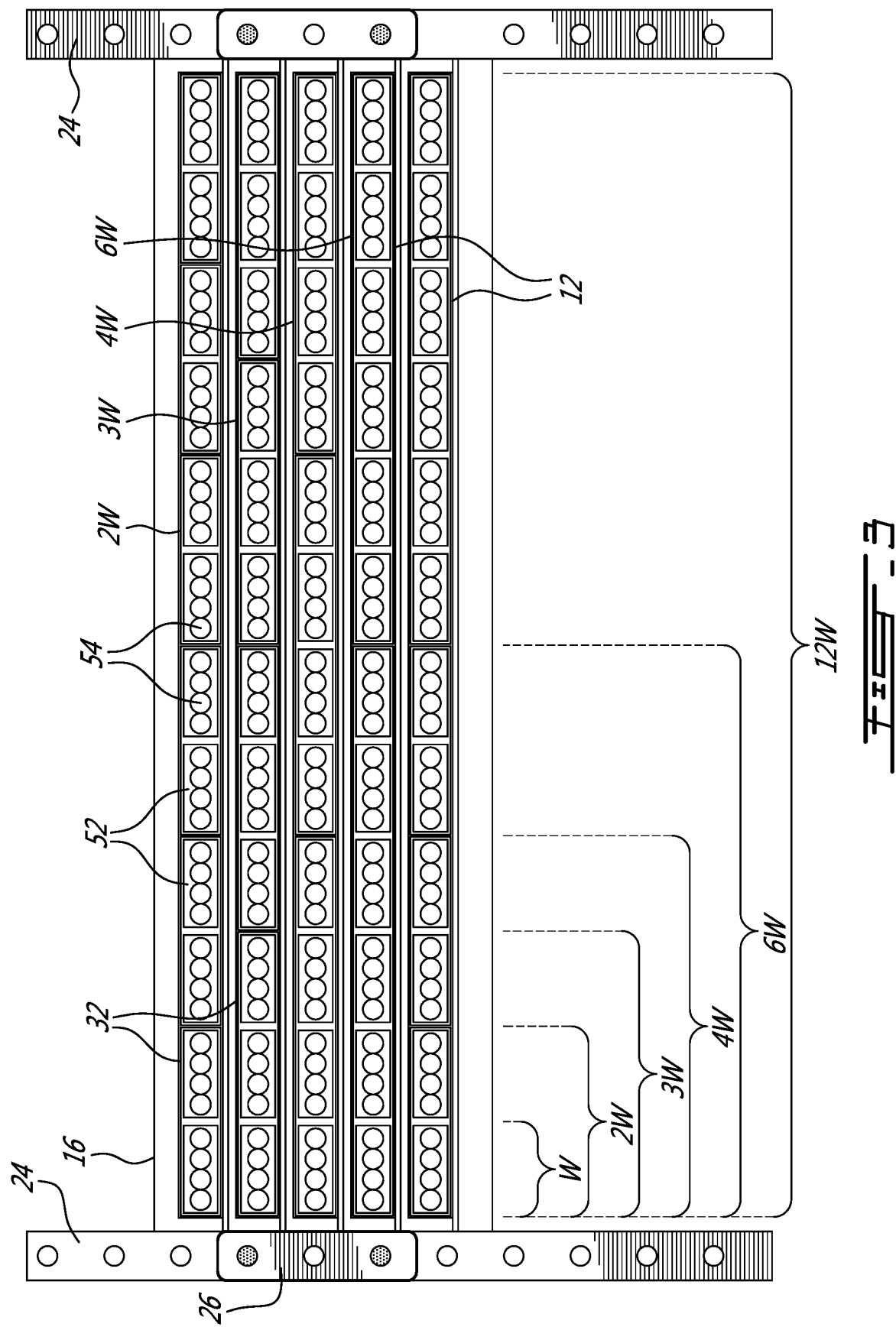
FIG. 3 provides a front plan view of a modular fiber optic cassette system mounted in a rack in accordance with an illustrative embodiment of the present invention.
Figure 4A:
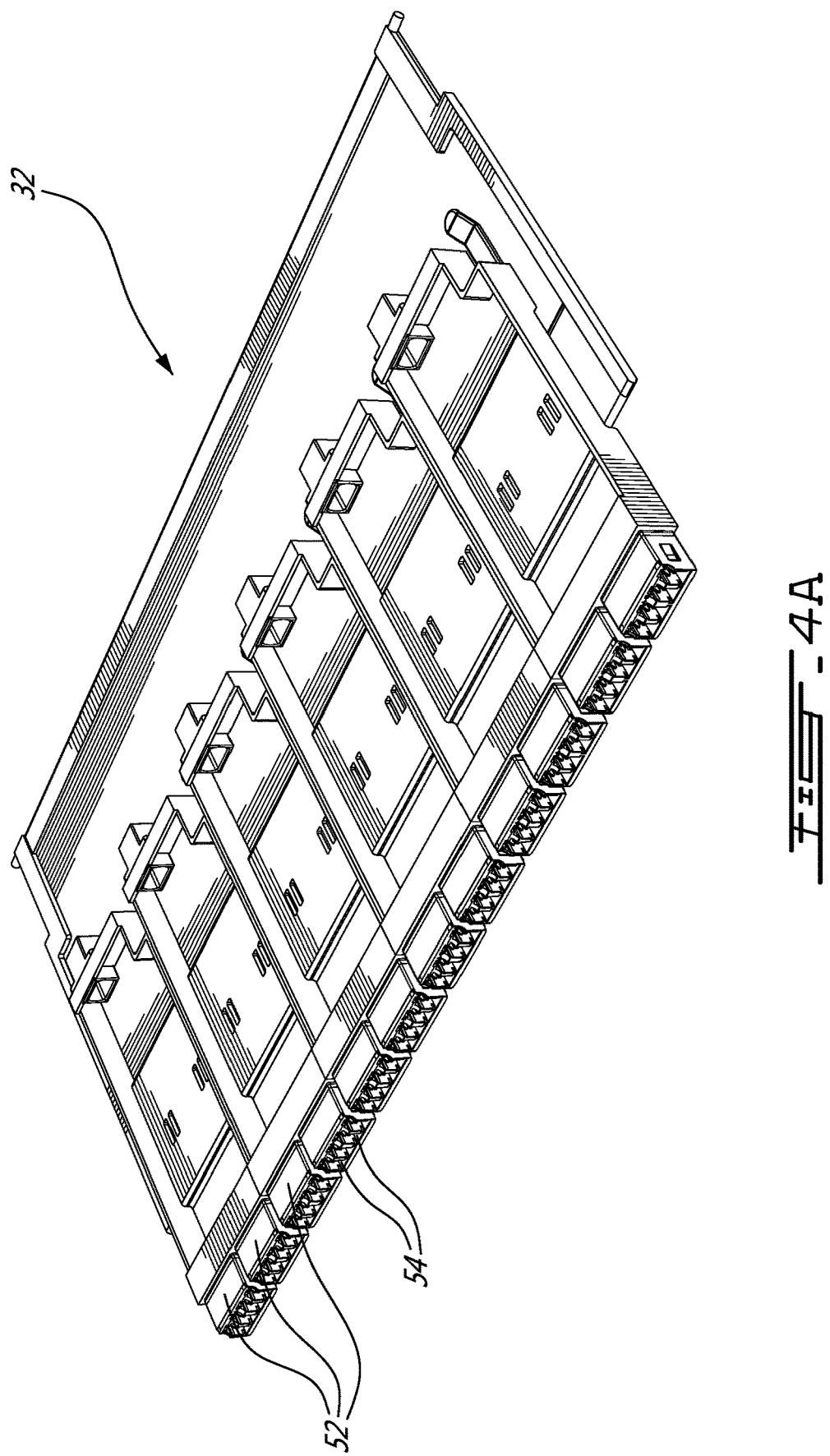
Figure 4C:
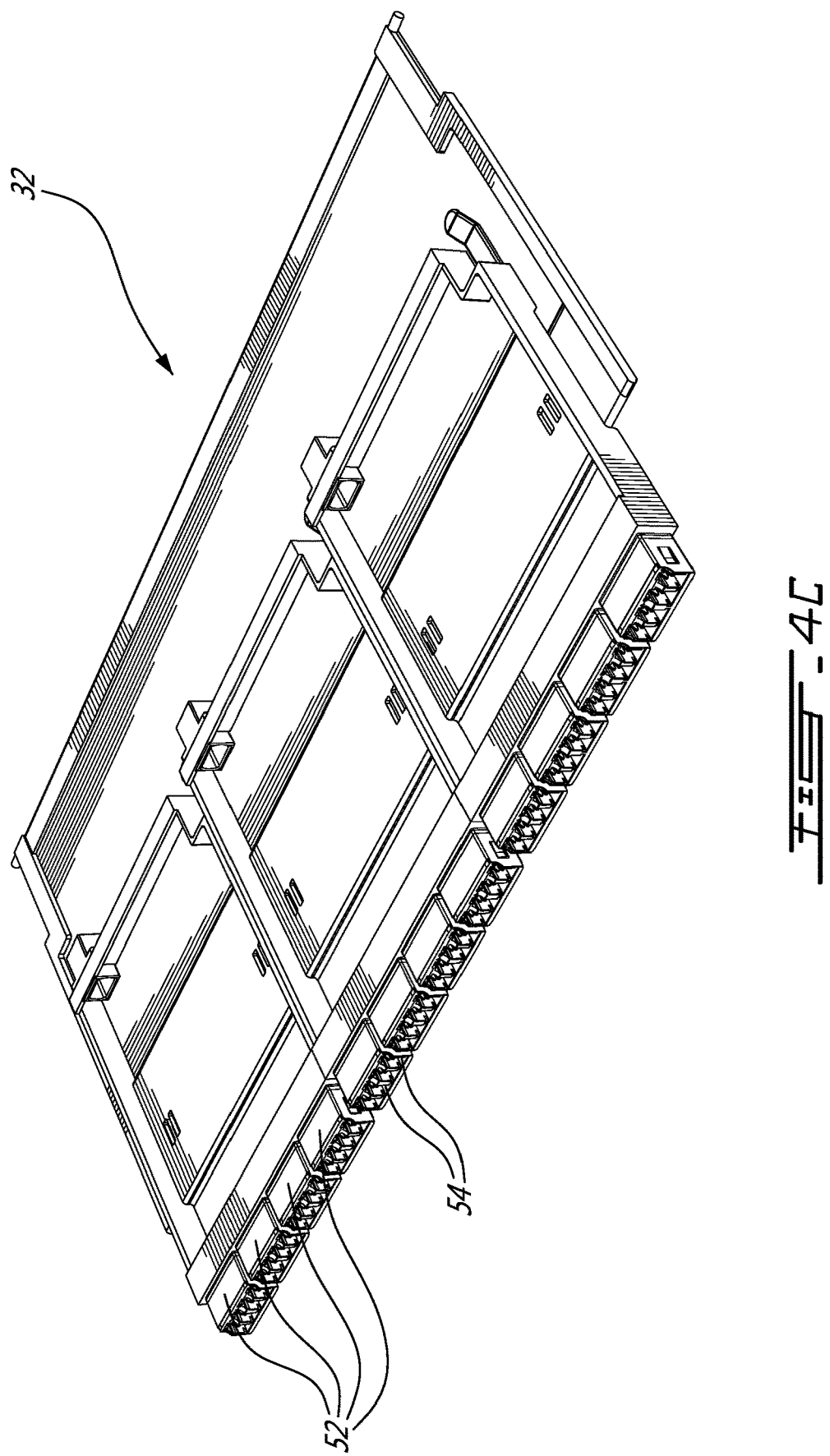

Referring to FIGS. 2A and 2B in addition to FIG. 1, the tray 12 receives a plurality of removable fiber optic module or cassettes 32 arranged side by side on an upper surface 34 thereof. In a first embodiment each fiber optic cassette 32 is secured to the tray 12 using a fastener comprising tabs 36 of inverted "T" cross section which engage with respective slots 38 machined or otherwise formed in the tray 12. A flexible tab 40 is also provided which comprises a boss 42 that engages a respective aperture 44 machined or otherwise formed in the tray 12 when the tabs 36 are engaged within their respective slots 38, thereby releasably securing the cassette 32 to the tray 12. In order to better orient the cassette 36 on the tray during installation, the tray 12 comprises a raised shoulder 46 which is received within a channel 48 moulded or otherwise formed in an underside 50 of the cassette 32.

Still referring to FIGS. 2A and 2B, each cassette 32 illustratively comprises a plurality of receptacle modules 52 each comprising a plurality of receptacles 54, illustratively LC Quad type receptacles, arranged in a row and exposed along a forward edge 56 of the cassette 32. The cassette 32 also illustratively terminates a fiber optic cable 58, such as a trunk cable or the like, comprising a plurality of optic fibers at a multi-fiber connector receiving receptacle 60 on a rearward edge. Each optic fiber of the fiber optic cable 58 is interconnected with a respective one of the receptacles 54 using an optic fiber segment 62 comprising a receptacle end which is terminated by a plug 64. The segments 62, which are typically longer than the distance between the forward edge and the rearward edge, are typically looped several times within the cassette 32, for example in a serpentine or the like. A person of ordinary skill in the art will understand that an optic fiber terminated with a plug (not shown) inserted into a selected one of the receptacles 54 will interconnect the optic fiber with a selected optic fiber segment 62.

Referring now to FIG. 3 and FIGS. 4A through 4D, as discussed above, each cassette 32 illustratively comprises a plurality of receptacle modules 52 each comprising four (4) receptacles 54. It is foreseen to provide a set of four (4) different cassette sizes to accommodate terminating fiber optic cables comprising different number of optic fibers. Each of the different cassette sizes of the set is based on an integer multiple of a standardised pitch or width unit W wherein one standardized width unit accommodates a single receptacle module 52 comprising four (4) receptacles 54. Illustratively, a 2W cassette 32 comprising two (2) modules 52 accommodating eight (8) optic fibers (FIG. 4A) is provided, a 3W cassette 32 comprising three (3) modules 52 accommodating twelve (12) optic fibers (FIG. 4B) is provided, a 4W cassette 32 comprising four (4) modules 52 accommodating sixteen (16) optic fibers (FIG. 4C) is provided and a 6W cassette 32 comprising six (6) modules 52 accommodating twenty-four (24) optic fibers (FIG. 4D) is provided for. The 2W, 3W, 4W and 6W cassettes 32 are typically used only with like cassettes 32 as illustrated and such that respectively six (6), four (4), three (3) and two (2) cassettes fit snuggly side by side on the 12W tray, although in a particular embodiment cassettes 32 of different widths could be used together.

Although the present illustrative embodiment In a particular embodiment the pitch/width W is based on a LC Quad (SC Duplex) technology footprint comprising four (4) connectors, in an alternative embodiment the pitch/width W could be based on a different technology footprint, including SC Duplex comprising two (2) connectors and MPO type connectors comprising inter alia multiple optic fibers such as MPO-12, MPO-16 and MPO-24.

Still referring to FIGS. 3, 4A through 4D in addition to FIG. 1, a person of ordinary skill in the art will now understand that the disclosed system of cassettes 32 can be used to accommodate optic fiber cables 58 comprising different numbers of optic fibers 62 while ensuring that the same number of optic fibers 62 are accessible via the exposed receptacles 54.

Referring back to FIG. 1, the spacing between adjacent slots 38 as well as the spacing between adjacent apertures 44 conforms to the standardised width unit W and such that the 2W, 3W, 4W and 6W cassettes 32 can be readily accommodated on the tray.

Figure 5A:
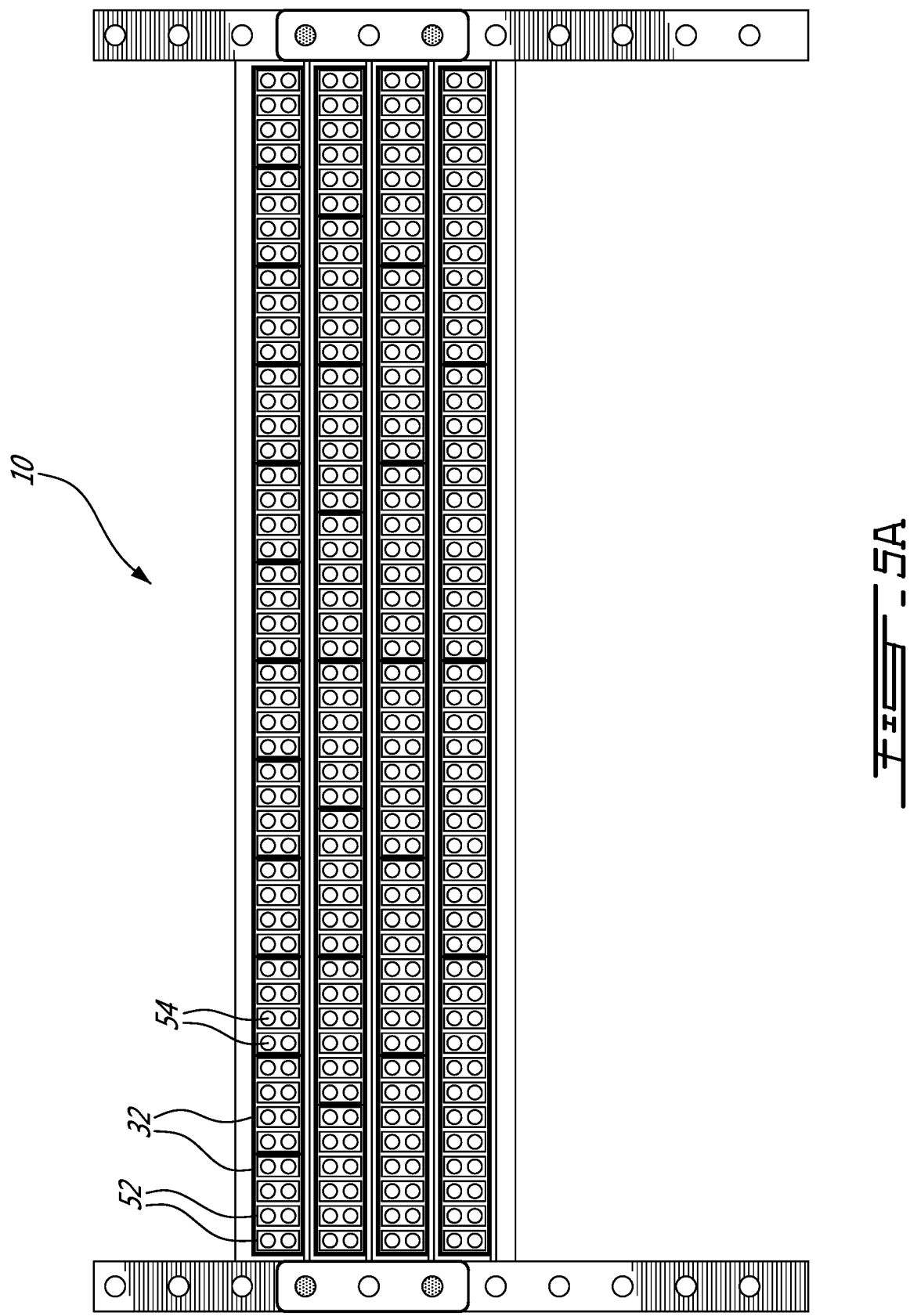

Referring now to FIG. 5A, in a first alternative embodiment of the system each receptacle modules 52 comprises a duplex type module arranged vertically. Additionally in a first cassette size four (4) of such duplex modules 52 are provided to provide for eight (8) receptacles 54 for terminating a fiber optic cable (not shown) comprised of eight (8) optic fibers. Similar to the first embodiment discussed above, sizes for twelve (12), sixteen (16) and twenty four (24) receptacles are also provided. Again, as the width of the cassettes is an integer multiple of the same pitch/width, cassettes of different widths can be used in the same tray system or in some cases on the same tray without modification or changing the density of the receptacles 54 for terminating optic fibres.

Referring now to FIG. 5B, in a second alternative embodiment of the system each receptacle modules 52 comprises a Quad type module arranged vertically. In a first cassette size two (2) of such quad modules 52 are provided to provide for eight (8) receptacles 54 for terminating a fiber optic cable (not shown) comprised of eight (8) optic fibers. Cassettes comprising three (3), four (4) and six (6) quad type modules 52 are provided to provide respectively twelve (12), sixteen (16) and twenty-four (24) receptacles. Again, as the width of the cassettes is an integer multiple of the same pitch/width, cassettes of different widths can be used in the same tray system or in some cases on the same tray without modification or changing the density of the receptacles 54 for terminating optic fibres.

Figure 5C:
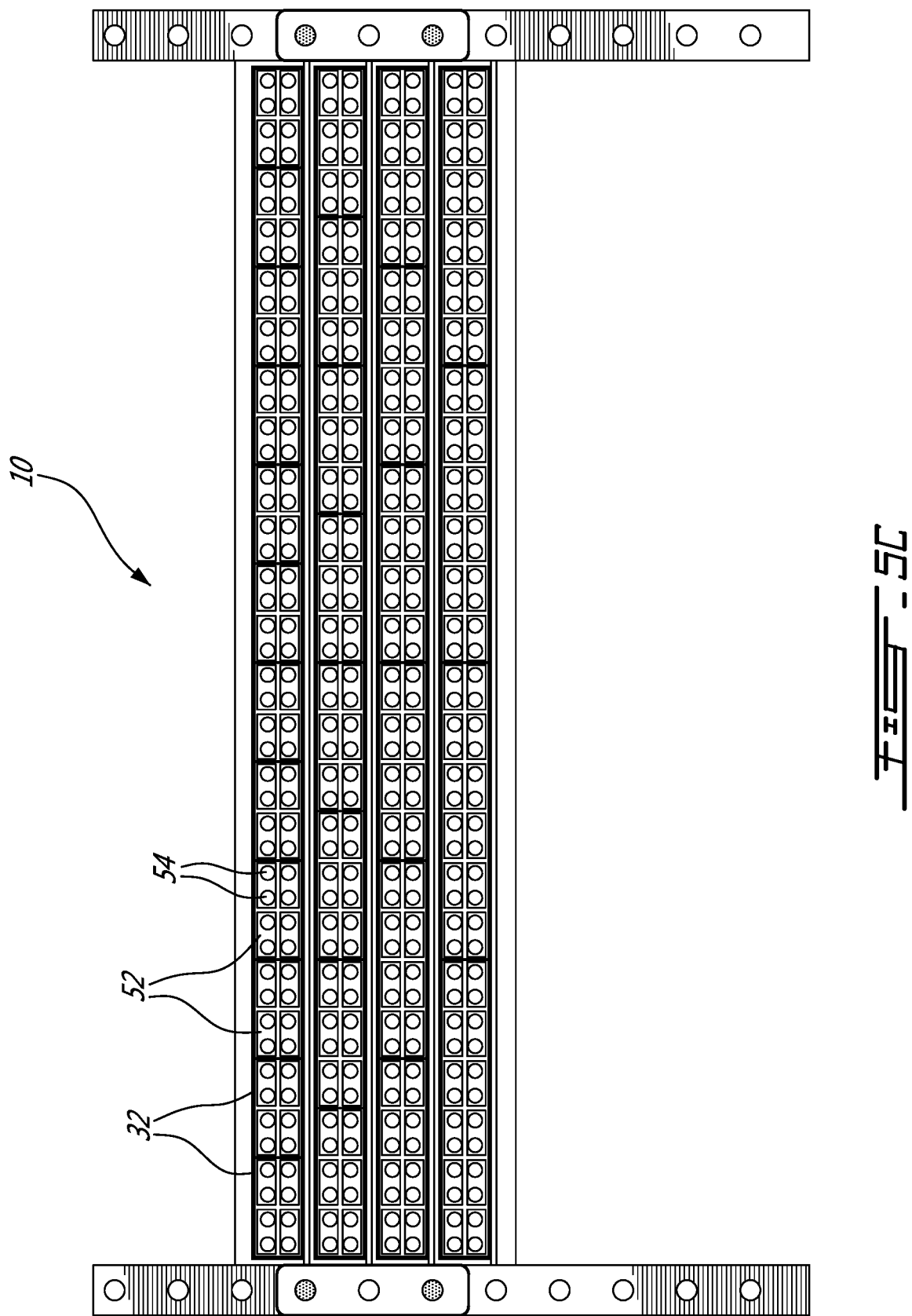

Referring now to FIG. 5C, in a third alternative embodiment of the system each receptacle modules 52 comprises a duplex type module arranged horizontally in two rows. In a first cassette size four (4) of such duplex modules 52 are provided to provide for eight (8) receptacles 54 for terminating a fiber optic cable (not shown) comprised of eight (8) optic fibers. Cassettes comprising six (6), eight (8) and twelve (12) duplex type modules 52 are provided to provide respectively twelve (12), sixteen (16) and twenty-four (24) receptacles. Again, as the width of the cassettes is an integer multiple of the same pitch/width, cassettes of different widths can be used in the same tray system or in some cases on the same tray without modification or changing the density of the receptacles 54 for terminating optic fibres.

Figure 6B:
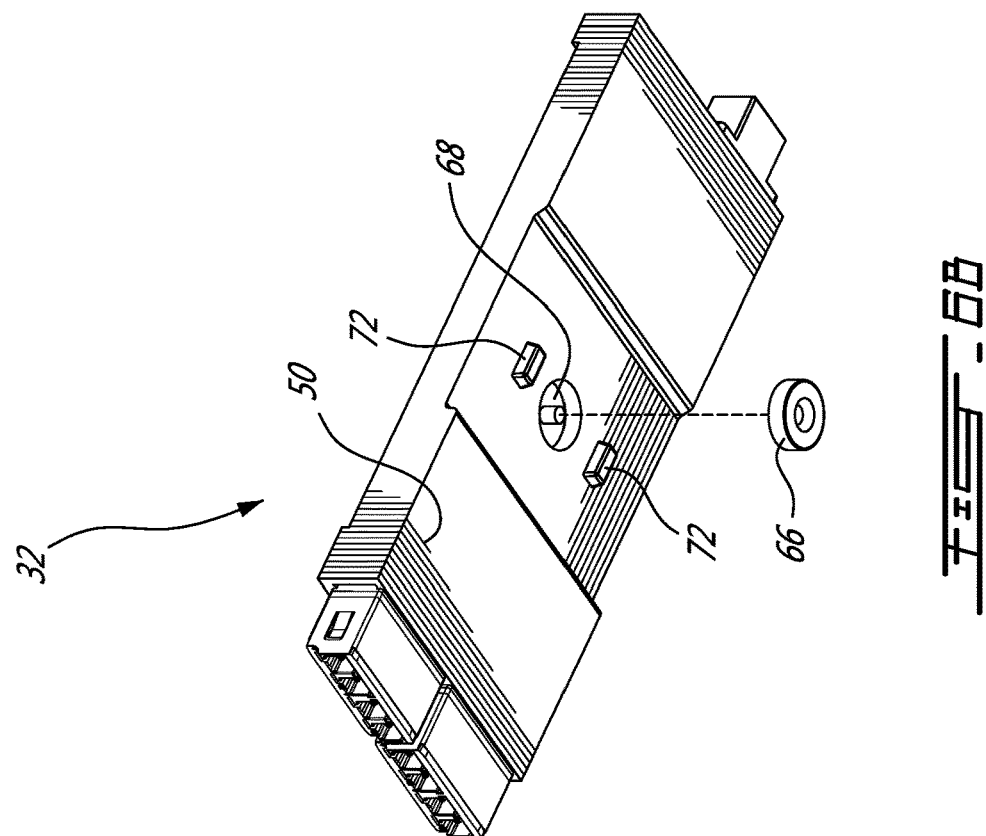
FIGS. 6A and 6B provide respectively a raised right front perspective view and a lowered right front perspective view of a modular fiber optic cassette in accordance with an alternative illustrative embodiment of the present invention.
Figure 6A:
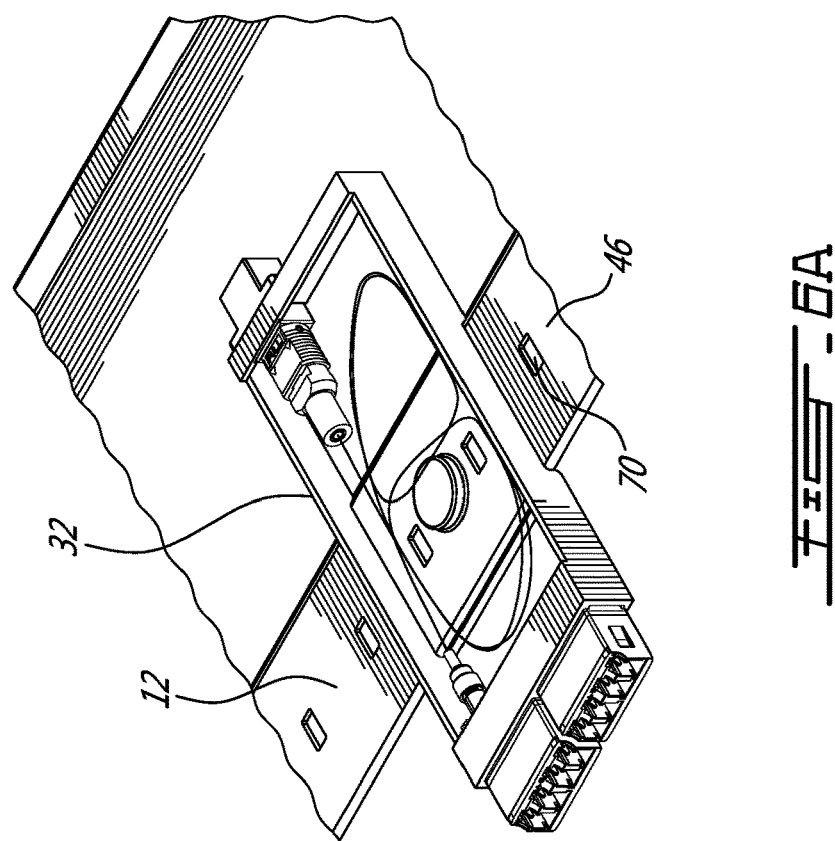

Referring now to FIGS. 6A and 6B in addition to FIG. 1, in an alternative embodiment of an assembly for securing the cassettes 32 to the tray 12 the tray 12 is manufactured from a ferrous material such as steel or the like and the fastener comprises a magnet 66 which is attracted to the tray and embedded or otherwise secured within a recess 68 formed in the underside 50 of the cassette 32. The tray 12, further comprises a series of spaced slots 70 arranged along the raised shoulder 46 which engage bosses 72 to ensure correct positioning of the cassettes 32 on the tray 12.

Figure 7A:
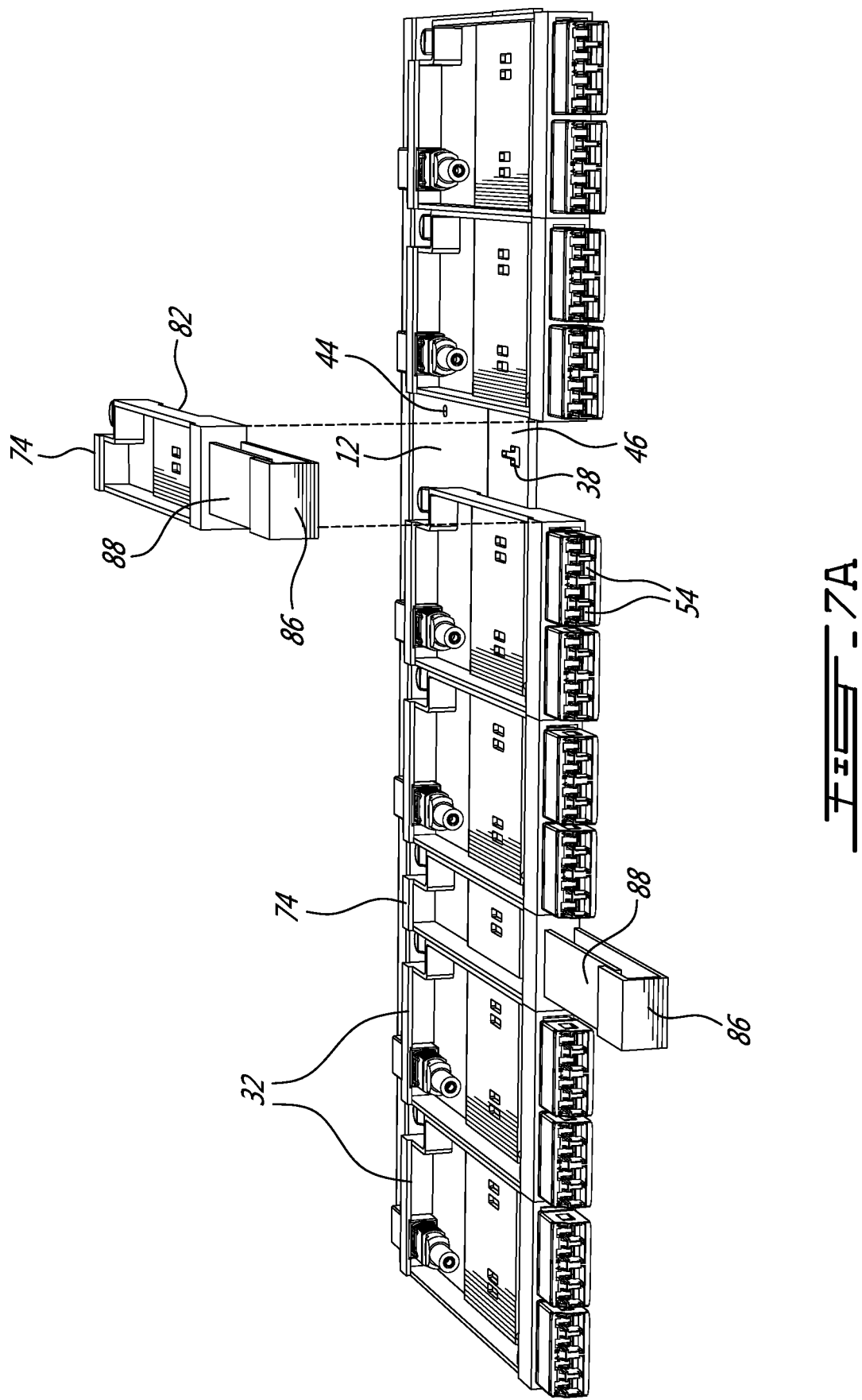

Referring now to FIG. 7A in a second alternative illustrative embodiment other equipment, such as a cable management bracket 74 can be provided with the same width W and such that they can be mounted to together with the cassettes 32 to the tray 12. In this regard, and with reference to FIG. 7B in addition to FIG. 7, the cable management bracket 74 is provided with tabs 76 comprising an inverted "T" cross section which engage with engage a slot 38 on the tray 12. A flexible tab 78 is provided which comprises a boss 80 that engages one of the apertures 44 in the tray 12 when the tab 76 is engaged within its respective slot 38, thereby releasable securing the cable management bracket 74 to the tray 12. In order to better orient the cable management bracket 74 on the tray during installation, the raised shoulder 46 of the tray 12 is received within a channel 82 moulded or otherwise formed in the underside 84 of the cable management bracket 74. Additionally, each cable management bracket 74 includes a cable management loop 86 for receiving a plurality of optic fibres (not shown) which are terminated at respective ones of the receptacles 54. A flexible strip 88 across the mouth of the cable management loop 86 is provided to releasably retain the plurality of optic fibers within the loop 86.

Although the present invention has been described hereinabove by way of specific embodiments thereof, it can be modified, without departing from the spirit and nature of the subject invention as defined in the appended claims.

The invention claimed is:

1. A fiber optic cassette tray for providing a plurality of different modular fiber optic cassette configurations in a fiber optic management system comprising:
   a tray having a front tray end portion and configured to be slidingly received in at least a portion of the tray receiving space of a housing of a fiber optic management system;
   wherein the tray is configured to support a plurality of different modular fiber optic cassette configurations when the tray is slidingly received in at least the portion of the tray receiving space;
   wherein the plurality of different modular fiber optic cassette configurations include a selected plurality of fiber optic cassettes that are each configured to be arranged side by side along the front tray end portion of the tray such that an outer side edge of each of the selected plurality of fiber optic cassettes is directly adjacent to an outer edge of at least one other fiber optic cassette;
   wherein each of the selected plurality of fiber optic cassettes include a plurality of fiber optic plug receiving receptacle portions;
   wherein the tray is configured to be removably secured to each of the selected plurality of fiber optic cassettes when each of the plurality of fiber optic plug receiving receptacle portions are arranged side by side in a row along the front tray end portion;
   wherein a first of the selected plurality of fiber optic cassettes comprises a first cassette width, as measured between outer side edges thereof, of two, three, four, or six standard width units;
   wherein a second of the selected plurality of fiber optic cassettes comprises a second cassette width, as measured between outer side edges thereof, of two, three, four, or six standard width units; and
   wherein the second cassette width is different from the first cassette width.

2. The fiber optic cassette tray of claim 1, wherein the tray has a tray width that is configured to receive at least twelve standard cassette width units side by side.

3. The fiber optic cassette tray of claim 1, wherein each of the fiber optic cassettes comprises a multi-fiber connector receiving receptacle portion arranged on a rear portion thereof and a plurality of optic fibers, one of the optic fibers being configured to interconnect a respective one of the optic plug receiving receptacle portions with the multi-fiber connector receiving receptacle portion.

4. The fiber optic cassette tray of claim 1, wherein each of the fiber optic cassettes comprises four fiber optic plug receiving receptacle portions configured to be arranged side by side in a row along a front portion thereof for each standard width unit.

5. The fiber optic cassette tray of claim 1, wherein the cassette tray is configured to be mounted in a rack.

6. The fiber optic cassette tray of claim 1, wherein the tray comprises a cassette fastening portion that is configured to removably secure the tray to each cassette.

7. The fiber optic cassette tray of claim 6, wherein the cassette fastening portion comprises a magnet.

8. The fiber optic cassette tray of claim 1, wherein the tray is configured to be removably secured to an elongate cable management bracket that includes a bracket width that corresponds to one of the standard width units.

9. The fiber optic cassette tray of claim 8, wherein the elongate cable management bracket includes a cable management loop that is configured to be positioned in front of and to a side of an optic plug receiving receptacle portion of a cassette when the cable management loop is removably secured to the tray.

10. The fiber optic cassette tray of claim 1, wherein the tray is configured to be removably secured to each of the plurality of the selected plurality of the set of fiber optic cassettes arranged side by side in the row such that an outer side edge portion of each of the selected plurality of the set of fiber optic cassettes faces a directly adjacent outside edge portion of at least one other selected fiber optic cassette.

11. The fiber optic cassette tray of claim 10, wherein an edge of the first tray end portion is substantially evenly divisible by a maximum of twelve (12) of the standard width units.

12. The fiber optic cassette tray of claim 11, wherein a third cassette of the selected plurality of fiber optic cassettes comprising a third width different from the first cassette width and the second cassette width.

13. The fiber optic cassette tray of claim 1, wherein the tray comprises an engagement feature configured to receive an engagement structure of the fiber optic cassettes.

14. The fiber optic cassette tray of claim 13, wherein the engagement feature comprises a slot and the engagement structure comprises a tab.

15. The fiber optic cassette tray of claim 14, wherein the tab is configured to have a T-shape cross section configured to engage the slot.

16. The fiber optic cassette tray of claim 13, wherein engagement feature comprises an aperture and the engagement structure comprises a flexible tab.

17. The fiber optic cassette tray of claim 16, wherein the flexible tab comprises a boss configure to engage the aperture.

18. A fiber optic cassette tray for providing a plurality of different modular fiber optic cassette configurations in a fiber optic management system comprising:
   a tray having a cassette engaging portion and configured to be slidingly received in at least a portion of the tray receiving space of a housing of a fiber optic management system;
   wherein the tray is configured to support a plurality of different modular fiber optic cassette configurations when the tray is slidingly received in at least the portion of the tray receiving space;
   wherein the plurality of different modular fiber optic cassette configurations includes a selected plurality of fiber optic cassettes that are each configured to be arranged side by side along the cassette engaging portion of the tray such that an outer side edge of each of the selected plurality of fiber optic cassettes adjacently faces an outer edge of at least one other fiber optic cassette;
   wherein each of the selected plurality of fiber optic cassettes include a plurality of fiber optic plug receiving receptacle portions;
   wherein the tray is configured to be removably secured to each of the selected plurality of fiber optic cassettes when each of the plurality of fiber optic plug receiving receptacle portions are arranged side by side in a row;
   wherein a first of the selected plurality of fiber optic cassettes comprises a first cassette width, as measured between outer side edges thereof, of two, three, four, and six standard width units;

wherein a second of the selected plurality of fiber optic cassettes comprises a second cassette width, as measured between outer side edges thereof, of two, three, four, and six standard width units; and wherein the second cassette width is different from the first cassette width.

19. The fiber optic cassette tray of claim 18, wherein the cassette engaging portion of the tray comprises a front tray end portion.

20. The fiber optic cassette tray of claim 18, wherein the plurality of different modular fiber optic cassette configurations includes the selected plurality of fiber optic cassettes that are each configured to be arranged side by side along the cassette engaging portion of the tray such that the outer side edge of each of the selected plurality of fiber optic cassettes is directly adjacent to the outer edge of at least one other fiber optic cassette.

21. The fiber optic cassette tray of claim 18, wherein the tray is configured to support the selected plurality of fiber optic cassettes that are each configured to be arranged side by side along the cassette engaging portion of the tray such that the outer side edge of each of the selected plurality of fiber optic cassettes is adjacent to the outer edge of at least one other fiber optic cassette.

22. The fiber optic cassette tray of claim 18, wherein the tray is configured to support the selected plurality of fiber optic cassettes that are each configured to be arranged side by side along the cassette engaging portion of the tray such that the outer side edge of each of the selected plurality of fiber optic cassettes is directly adjacent to the outer edge of at least one other fiber optic cassette.

23. The fiber optic cassette tray of claim 18, wherein the tray is configured to be removably secured to each of the selected plurality of fiber optic cassettes when each of the plurality of fiber optic plug receiving receptacle portions are arranged side by side in a row along a front end portion of the tray.

24. The fiber optic cassette tray of claim 18, wherein the tray has a tray width that is configured to receive at least twelve standard cassette width units side by side.

25. The fiber optic cassette tray of claim 18, wherein each of the fiber optic cassettes comprises a multi-fiber connector receiving receptacle portion arranged on a rear portion thereof and a plurality of optic fibers, one of the optic fibers being configured to interconnect a respective one of the optic plug receiving receptacle portions with the multi-fiber connector receiving receptacle portion.

26. The fiber optic cassette tray of claim 18, wherein each of the fiber optic cassettes comprises four fiber optic plug receiving receptacle portions configured to be arranged side by side in a row along a front portion thereof for each standard width unit.

27. The fiber optic cassette tray of claim 18, wherein the tray is configured to be mounted in a rack.

28. The fiber optic cassette tray of claim 18, wherein the tray comprises a cassette fastening portion that is configured to removably secure the tray to each cassette.

29. The fiber optic cassette tray of claim 18, wherein the cassette fastening portion comprises a magnet.

30. The fiber optic cassette tray of claim 18, wherein the tray is configured to be removably secured to an elongate cable management bracket that includes a bracket width that corresponds to one of the standard width units.

31. The fiber optic cassette tray of claim 30, wherein the elongate cable management bracket includes a cable management loop that is configured to be positioned in front of and to a side of an optic plug receiving receptacle portion of a cassette when the cable management loop is removably secured to the tray.

32. The fiber optic cassette tray of claim 18, wherein the tray is configured to be removably secured to each of the plurality of the selected plurality of the set of fiber optic cassettes arranged side by side in the row such that an outer side edge portion of each of the selected plurality of the set of fiber optic cassettes faces a directly adjacent outside edge portion of at least one other selected fiber optic cassette.

33. The fiber optic cassette tray of claim 18, wherein a width of a front edge of the cassette engaging portion is substantially evenly divisible by a maximum of twelve (12) of the standard width units.

34. The fiber optic cassette tray of claim 18, wherein a third cassette of the selected plurality of fiber optic cassettes comprising a third width different from the first cassette width and the second cassette width.

35. The fiber optic cassette tray of claim 18, wherein the tray comprises an engagement feature configured to receive an engagement structure of the fiber optic cassettes.

36. The fiber optic cassette tray of claim 35, wherein the engagement feature comprises a slot and the engagement structure comprises a tab.

37. The fiber optic cassette tray of claim 36, wherein the tab is configured to have a T-shape cross section configured to engage the slot.

38. The fiber optic cassette tray of claim 35, wherein the engagement feature comprises an aperture and the engagement structure comprises a flexible tab.

39. The fiber optic cassette tray of claim 38, wherein the flexible tab comprises a boss configure to engage the aperture.

40. A tray for providing a plurality of different modular fiber optic cassette configurations in a fiber optic management system comprising:

a tray configured to fit a plurality of different modular fiber optic cassette configurations in a case of a fiber management system;

wherein the plurality of different modular fiber optic cassette configurations includes a selected plurality of fiber optic cassettes that are each configured to be arranged side by side along the tray such that an outer side edge of each of the selected plurality of fiber optic cassettes adjacently faces an outer edge of at least one other fiber optic cassette;

wherein each of the selected plurality of fiber optic cassettes includes a plurality of fiber optic plug receiving receptacle portions;

wherein the tray is configured to be removably secured to each of the selected plurality of fiber optic cassettes that are each configured to be arranged side by side along the tray;

wherein a first of the selected plurality of fiber optic cassettes comprises a first cassette width, as measured between outer side edges thereof, of two, three, four, and six standard width units;

wherein a second of the selected plurality of fiber optic cassettes comprises a second cassette width, as measured between outer side edges thereof, of two, three, four, and six standard width units; and wherein the second cassette width is different from the first cassette width.

41. The tray of claim 40, wherein each of the selected plurality of fiber optic cassettes are configured to be arranged side by side along a cassette engaging portion of the tray.

42. The tray of claim 40, wherein the cassette engaging portion comprises a shoulder and each of the selected plurality of fiber optic cassettes comprises a channel that is configured to receive the shoulder.

43. The tray of claim 42, wherein the cassette engaging portion of the tray comprises a front tray end portion.

44. The tray of claim 40, wherein the tray is configured to be slidingly received in at least portion of a tray receiving space of a case of a fiber optic management system.

45. The tray of claim 40, wherein the plurality of different modular fiber optic cassette configurations includes the selected plurality of fiber optic cassettes that are each configured to be arranged side by side along the tray such that the outer side edge of each of the selected plurality of fiber optic cassettes is directly adjacent to the outer edge of at least one other fiber optic cassette.

46. The tray of claim 40, wherein the tray is configured to support the selected plurality of fiber optic cassettes that are each configured to be arranged side by side along the tray such that the outer side edge of each of the selected plurality of fiber optic cassettes is adjacent to the outer edge of at least one other fiber optic cassette.

47. The tray of claim 40, wherein the tray is configured to support the selected plurality of fiber optic cassettes that are each configured to be arranged side by side along the tray such that the outer side edge of each of the selected plurality of fiber optic cassettes is directly adjacent to the outer edge of at least one other fiber optic cassette.

48. The tray of claim 40, wherein the tray is configured to support the selected plurality of fiber optic cassettes that are each configured to be arranged side by side along the tray such that the outer side edge of each of the selected plurality of fiber optic cassettes touches the outer edge of at least one other fiber optic cassette.

49. The tray of claim 40, wherein the tray is configured to be removably secured to each of the selected plurality of fiber optic cassettes when each of the plurality of fiber optic plug receiving receptacle portions are arranged side by side in a row along a front end portion of the tray.

50. The tray of claim 40, wherein the tray has a tray width that is configured to receive at least twelve standard width units side by side.

51. The tray of claim 40, wherein the tray has first tray end portion, a second tray end portion spaced away from the first tray end portion so as to define a tray width extending between the first tray end portion and the second tray end portion, and wherein the tray width is configured to fit at least twelve standard width units side by side along the tray.

52. The tray of claim 40, wherein each of the fiber optic cassettes comprises a multi-fiber connector receiving receptacle portion arranged on a rear portion thereof and a plurality of optic fibers, one of the optic fibers being configured to interconnect a respective one of the optic plug receiving receptacle portions with the multi-fiber connector receiving receptacle portion.

53. The tray of claim 40, wherein each of the fiber optic cassettes comprises four fiber optic plug receiving receptacle portions configured to be arranged side by side in a row along a front portion thereof for each standard width unit.

54. The tray of claim 40, wherein the cassette tray is configured to be mounted in a rack.

55. The tray of claim 40, wherein the cassette tray is configured to be mounted in a standard U-space rack.

56. The tray of claim 40, wherein the tray comprises a cassette fastening portion that is configured to removably secure the tray to each cassette.

57. The tray of claim 40, wherein the cassette fastening portion comprises a magnet.

58. The tray of claim 40, wherein the tray is configured to be removably secured to an elongate cable management bracket that includes a bracket width that corresponds to one of the standard width units.

59. The tray of claim 58, wherein the elongate cable management bracket includes a cable management loop that is configured to be positioned in front of and to a side of an optic plug receiving receptacle portion of a cassette when the cable management loop is removably secured to the tray.

60. The tray of claim 40, wherein a third cassette of the selected plurality of fiber optic cassettes comprises a third width different from the first cassette width and the second cassette width.

61. The tray of claim 40, wherein the tray comprises an engagement feature configured to receive an engagement structure of the fiber optic cassettes.

62. The tray of claim 61, wherein the engagement feature comprises a slot and the engagement structure comprises a tab.

63. The tray of claim 62, wherein the tab is configured to have a T-shape cross section configured to engage the slot.

64. The tray of claim 61, wherein the engagement feature comprises an aperture and the engagement structure comprises a flexible tab.

65. The tray of claim 64, wherein the flexible tab comprises a boss configure to engage the aperture.

* * * * *

Disclaimer

11,656,422 B2 - Vincent Pilon, Lachine (CA). MODULAR FIBER OPTIC CASSETTE, SYSTEM AND METHOD. Patent dated May 23, 2023. Disclaimer filed July 17, 2025, by the assignee, Belden Canada ULC.

I hereby disclaim the following complete Claims 1-6, 10-14, 16, 18, 20-28, 32-36, 38, 40-42, 44-56, 60-62 and 64 of said patent.

*(Official Gazette, August 26, 2025)*